March 29, 1927.  1,622,922
J. A. PETERSON ET AL
INSECT DESTROYER
Filed Dec. 8, 1923  2 Sheets-Sheet 1
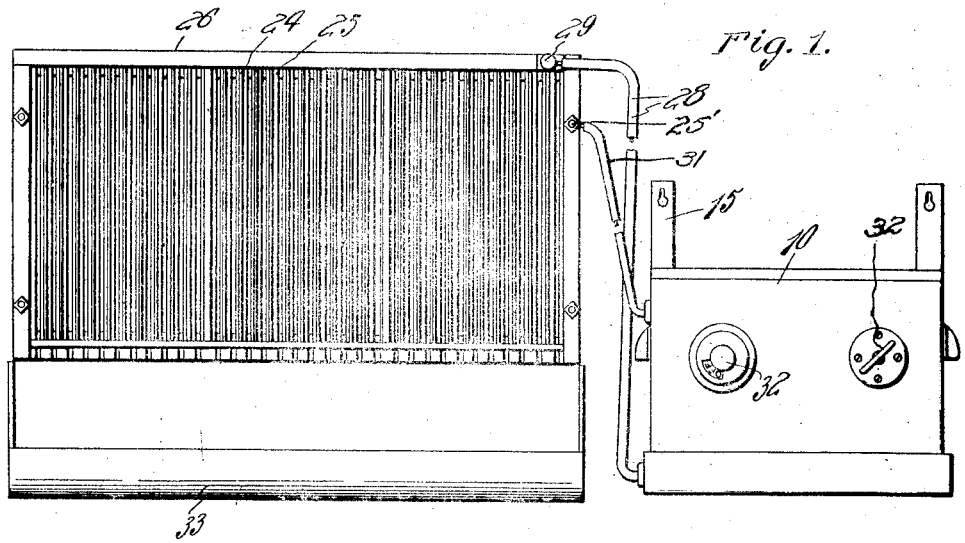
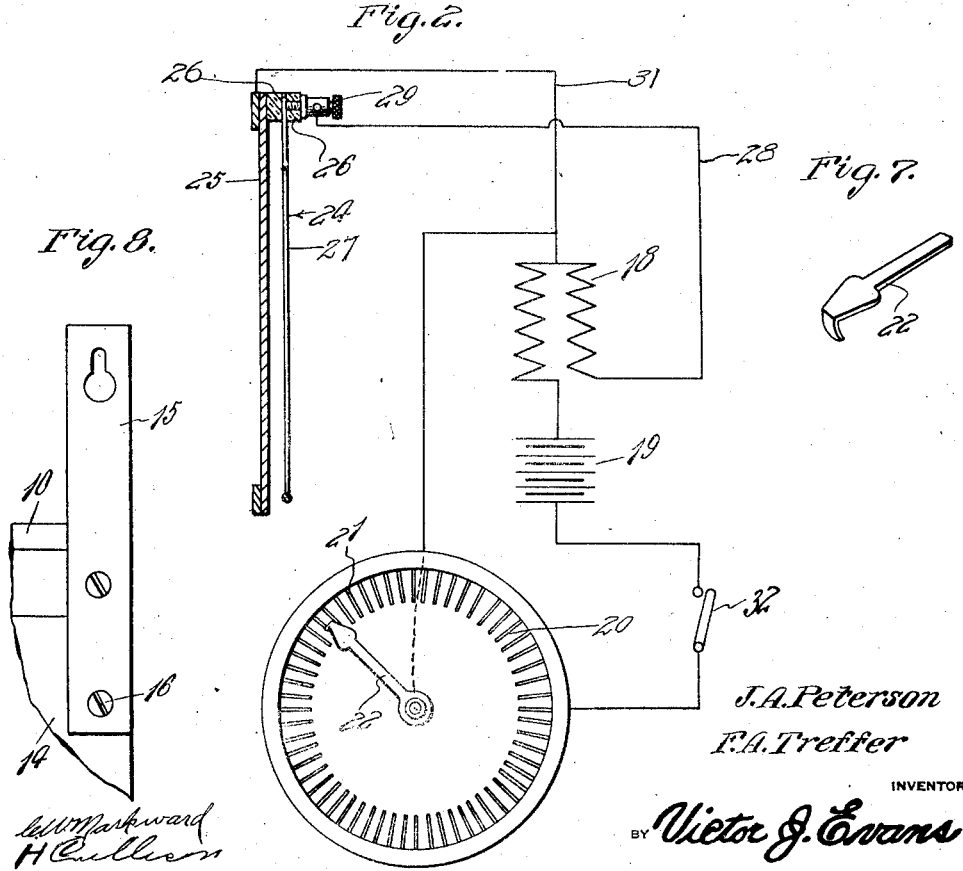
J.A. Peterson
F.A. Treffer
INVENTOR
BY Victor J. Evans
ATTORNEY
WITNESS:

March 29, 1927.
J. A. PETERSON ET AL
INSECT DESTROYER
Filed Dec. 8, 1923   2 Sheets-Sheet 2
1,622,922
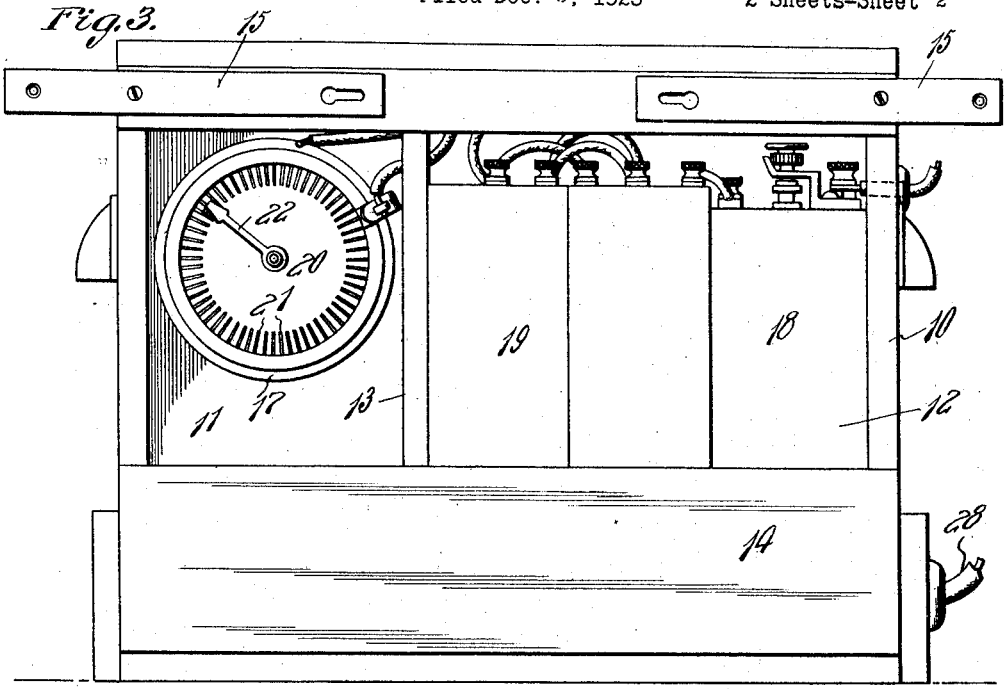
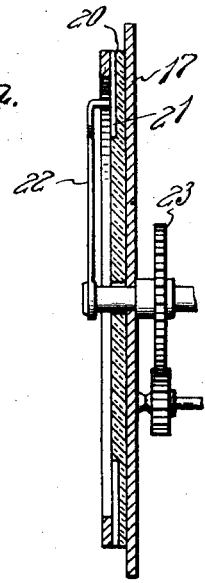
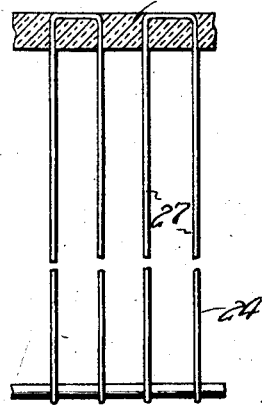
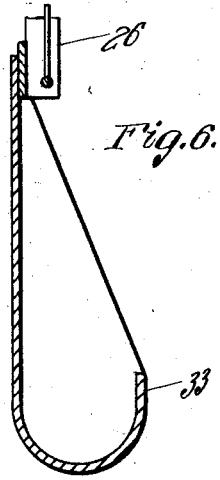
J.A.Peterson
F.A.Treffer
INVENTOR
ATTORNEY Patented Mar. 29, 1927.

1,622,922

UNITED STATES PATENT OFFICE.

JOHN A. PETERSON AND FREDERICK A. TREFFER, OF MORRILL, KANSAS.

INSECT DESTROYER.

Application filed December 8, 1923. Serial No. 679,435.

This invention contemplates the provision of an apparatus designed to kill rodents and all kinds of insects, and embodies amongst other features a pair of spaced metallic frames arranged in an electric circuit which also includes a coil of the vibrating type, so that when the animal or insect positions itself with relation to said frames to cause the high tension current to jump from one frame to the other, the current passes through the body of the animal or insect killing the same.

In carrying out the invention, we also provide a time controlled circuit closer, so that the primary circuit is broken at predetermined intervals.

The nature and advantages of the invention will be better understood when the following detailed description is read in connection with the accompanying drawings, the invention residing in the construction, combination and arrangement of parts as claimed.

In the drawings forming part of this application, like numerals of reference indicate similar parts in the several views, and wherein:

Fig. 1 is an elevation view of the insect trap and the cabinet attached thereto which contains the source of electric energy.

Fig. 2 is a view partly diagrammatic and partly sectional, showing the arrangement of elements for establishing the oscillating circuit and showing also the relationship of the grid electrodes.

Fig. 3 is a view in elevation of the interior of the cabinet, showing the arrangement of the elements which constitute the operating mechanism.

Fig. 4 is a view partially in section showing the operating means for the circuit closer.

Fig. 5 is a detail view showing the manner in which the front grid or electrode is mounted.

Fig. 6 shows the type of trough adapted for use in the device described.

Fig. 7 is a partial view of the outer end of circuit closer pointer.

Fig. 8 is a partial elevation showing the type of bracket used to support the cabinet on a wall or similar structure, and which serves to maintain the cabinet door in a closed position.

Referring to the drawings in detail, 10 represents a box like cabinet divided into separate compartments 11 and 12 by means of a partition 13. The cabinet is provided with a hinged door 14 at the rear thereof, and the door is maintained closed by brackets 15 which serve to support the cabinet upon a wall or other structure. The brackets are of course pivoted between the ends to the rear wall of the cabinet, and only having their lower portions arranged against the outside of the lower door being secured thereto by fastening elements 16. In order to gain access to the cabinet it is only necessary to remove the fastening elements 16 and subsequently turn the brackets upon their pivots to a horizontal position. Positioned in the compartment 11 is a time controlled circuit closer 17, included in primary circuit of coil 18, the latter being positioned within the compartment 12, which also contains the batteries or source of current indicated at 19. It might here be stated that the coil 18 is of the vibrating type. The electric circuit is of course intermittently broken and closed at predetermined intervals by means of the circuit closer which embodies a dial 20 having a circumferential series of spaced contacts 21. This circuit closer further includes a hand 22 which is controlled by the clock mechanism 23, the free end of the hand being bent inwardly to wipe the contacts 21. Consequently, the circuit is closed every time the hand is brought into engagement with one of these contacts 21, and broken as the hand passes between the contacts, any number of these contacts 21 may be used and spaced different distances apart, so that the circuit can be closed at any desired interval. The contacts however are generally spaced apart so that the circuit is closed sixty times during one complete revolution of the hand.

Included in the electric circuit is a pair of spaced metallic frames 24 and 25 respectively, these frames being supported on the opposed sides of a frame 26 of insulating material. Each frame includes spaced parallel electrodes 27, which can be spaced apart any desired distance. The high tension lead wire 28 extends from the coil to the binding post 29 supported by the metallic frame 24, while the ground wire 31 is connected with the binding post 25' connected with the frame 25 which constitutes a ground for the circuit. The circuit of course, also includes a manually operable switch 32 which is supported upon the cabinet 10. The frames as a unit can be used wherever desired, that is, they can be supported upon a screen door (not shown), or can be used in barns or other places where rodents constitute a pest. When used to destroy rodents, the electrodes are arranged further apart than when used for killing insects, and when the apparatus is used for the latter mentioned purpose, a trough 33 is arranged directly beneath the frame like unit to receive and collect the insects as they are killed and fall from the electrodes.

In practice, the manually operable switch is turned on, after which the circuit above described is intermittently broken and closed by means of the time controlled circuit closer. The secondary circuit passes through the frame 24 until the animal or insect places itself in a position with relation to the frames 24 and 25 so as to cause the high tension current to jump from the frame 24 to the ground frame 25, in which instance, of course, this current passes through the body of the animal or insect thereby killing the latter. The electrodes are spaced a sufficient distance apart to prevent the insects or animals from lodging between the electrodes and affording ample space for them to enter the space between the frames for the purpose stated. The apparatus is not only simple in construction, but very effective for the purpose intended.

While it is believed that from the foregoing description, the nature and advantages of the invention will be readily apparent, we desire to have it understood that we do not limit ourselves to what is herein shown and described and that such changes may be resorted to when desired as fall within the scope of what is claimed.

Having thus described the invention, we claim:

In an insect destroyer, a trough including a flat straight vertical rear wall, having its lower edge curved forwardly and terminating in spaced parallel relation to said wall in the formation of a trough coextensive with the width of said wall, end members closing the ends of said trough and having upwardly inclined edges, a frame of insulating material connected with said wall, primary and secondary circuits including a source of current, metallic frames arranged upon the opposite sides of the insulating frame and supported thereby in spaced parallel relation, said frames including spaced electrodes and adapted to be included in said circuits through the body of an insect contacting the electrodes.

In testimony whereof we affix our signatures.

JOHN A. PETERSON.
FREDERICK A. TREFFER.